(12) United States Patent
Kawamura et al.

(10) Patent No.: US 11,093,995 B2
(45) Date of Patent: Aug. 17, 2021

(54) MONITORING OF CUSTOMER CONSUMPTION ACTIVITY AND MANAGEMENT BASED ON MONITORING

(71) Applicant: TOSHIBA TEC KABUSHIKI KAISHA, Tokyo (JP)

(72) Inventors: Motonobu Kawamura, Kamagaya Chiba (JP); Masashi Fukuda, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 16/289,381

(22) Filed: Feb. 28, 2019

(65) Prior Publication Data
US 2019/0272580 A1    Sep. 5, 2019

(30) Foreign Application Priority Data

Mar. 2, 2018   (JP) .............................. JP2018-037865

(51) Int. Cl.
*G06Q 30/00* (2012.01)
*G06Q 30/06* (2012.01)
(Continued)

(52) U.S. Cl.
CPC ..... *G06Q 30/0633* (2013.01); *G06K 9/00771* (2013.01); *G06K 9/6202* (2013.01);
(Continued)

(58) Field of Classification Search
CPC ............. G06K 9/6202; G06K 9/00664; G06K 9/00771; G06Q 30/0631; G06Q 30/0633;
(Continued)

(56) References Cited

U.S. PATENT DOCUMENTS

| 5,602,730 A | * | 2/1997 | Coleman | ............... G06Q 10/087 |
| | | | | 705/15 |
| 2015/0206259 A1 | * | 7/2015 | Takahashi | .......... G06K 9/00771 |
| | | | | 705/15 |

(Continued)

FOREIGN PATENT DOCUMENTS

| CN | 107403248 A | 11/2017 |
| JP | 2016-015071 A | 1/2016 |

OTHER PUBLICATIONS

Deiano, Daryl: "Are Waiters in Danger of Being Replaced With Tablets and Robots?" iRe Tron Blog, Jan. 30, 2017, 3pgs. (Year: 2017).*

(Continued)

*Primary Examiner* — Robert M Pond
(74) *Attorney, Agent, or Firm* — Kim & Stewart LLP

(57) ABSTRACT

A monitoring-based service providing system includes a table monitoring terminal associated with one of a plurality of tables in a venue, a central control terminal, and an order terminal associated with said one of the plurality of tables. The central control terminal includes a communication interface communicable with the table monitoring terminal, and a controller. The controller is configured to compare the image data received at first timing with the image data received at second timing after the first timing, determine a remaining amount of the consumable item based on a comparison result of the image data received at the first and second timing, and generate recommendation information upon the determining remaining amount decreasing to a predetermined threshold, and control the second communication interface to transmit the generated recommendation information. The order terminal includes a display, on which a recommendation screen is displayed based on the recommendation information.

20 Claims, 12 Drawing Sheets

(51) Int. Cl.
    *H04N 5/232*    (2006.01)
    *H04N 7/18*     (2006.01)
    *G06K 9/62*     (2006.01)
    *G06K 9/00*     (2006.01)
    *G06Q 20/20*    (2012.01)
(52) U.S. Cl.
    CPC ..... *G06Q 30/0631* (2013.01); *H04N 5/23299* (2018.08); *H04N 7/183* (2013.01); *G06Q 20/20* (2013.01)
(58) Field of Classification Search
    CPC .. G06Q 20/208; G06Q 20/203; G07G 1/0063; H04N 7/183; H04N 5/23299; G07F 9/026
    USPC ...................................................... 705/26, 27
    See application file for complete search history.

(56) References Cited

U.S. PATENT DOCUMENTS

2018/0247134 A1\* 8/2018 Bulzacki ............. A63F 3/00157
2018/0276770 A1\* 9/2018 Cronin ............... G06K 9/00771

OTHER PUBLICATIONS

Chinese First Office Action dated Jan. 27, 2021 mailed in counterpart Chinese Patent Application No. 201910074707.X, 20 pages (with Translation).

\* cited by examiner

MONITORING OF CUSTOMER CONSUMPTION ACTIVITY AND MANAGEMENT BASED ON MONITORING

CROSS-REFERENCE TO RELATED APPLICATION

This application is based upon and claims the benefit of priority from Japanese Patent Application No. 2018-037865, filed on Mar. 2, 2018, the entire contents of which are incorporated herein by reference.

FIELD

Embodiments described herein relate generally to a system to perform monitoring of a customer consumption activity and management based on the monitoring.

BACKGROUND

In a related art, an order processing system, in which a customer orders a desired or selected consumable item (food, alcohol and beverage) by operating an order terminal, is utilized in a restaurant. The order processing system includes a function of offering a recommended item for promotion.

In such a menu order system, it may be necessary to recommend an item at an appropriate timing according to the customer based on a consumption state of a consumable item.

DETAILED DESCRIPTION

According to an embodiment, a monitoring-based service providing system includes a table monitoring terminal associated with one of a plurality of tables in a venue, a central control terminal, and an order terminal associated with said one of the plurality of tables. The table monitoring terminal includes a camera, a driving mechanism configured to change a direction of the camera, a first communication interface, and a first controller. The first controller is configured to control the driving mechanism such that the camera is directed to at least a consumable item on an associated table, and control the first communication interface to transmit image data of an image including a consumable item captured by the camera. The central control terminal includes a second communication interface communicable with the first communication interface, and a second controller. The second controller is configured to compare the image data received by the second communication at first timing with the image data received by the second communication interface at second timing after the first timing, determine a remaining amount of the consumable item based on a comparison result of the image data received at the first and second timing, and generate recommendation information upon the determining remaining amount decreasing to a predetermined threshold, and control the second communication interface to transmit the generated recommendation information. The order terminal includes a third communication interface communicable with the second communication interface, a display, and a third controller configured to control the display to display a recommendation screen based on the recommendation information received by the third communication interface.

Hereinafter, an embodiment is described with reference to the accompanying drawings.

Figure 1:
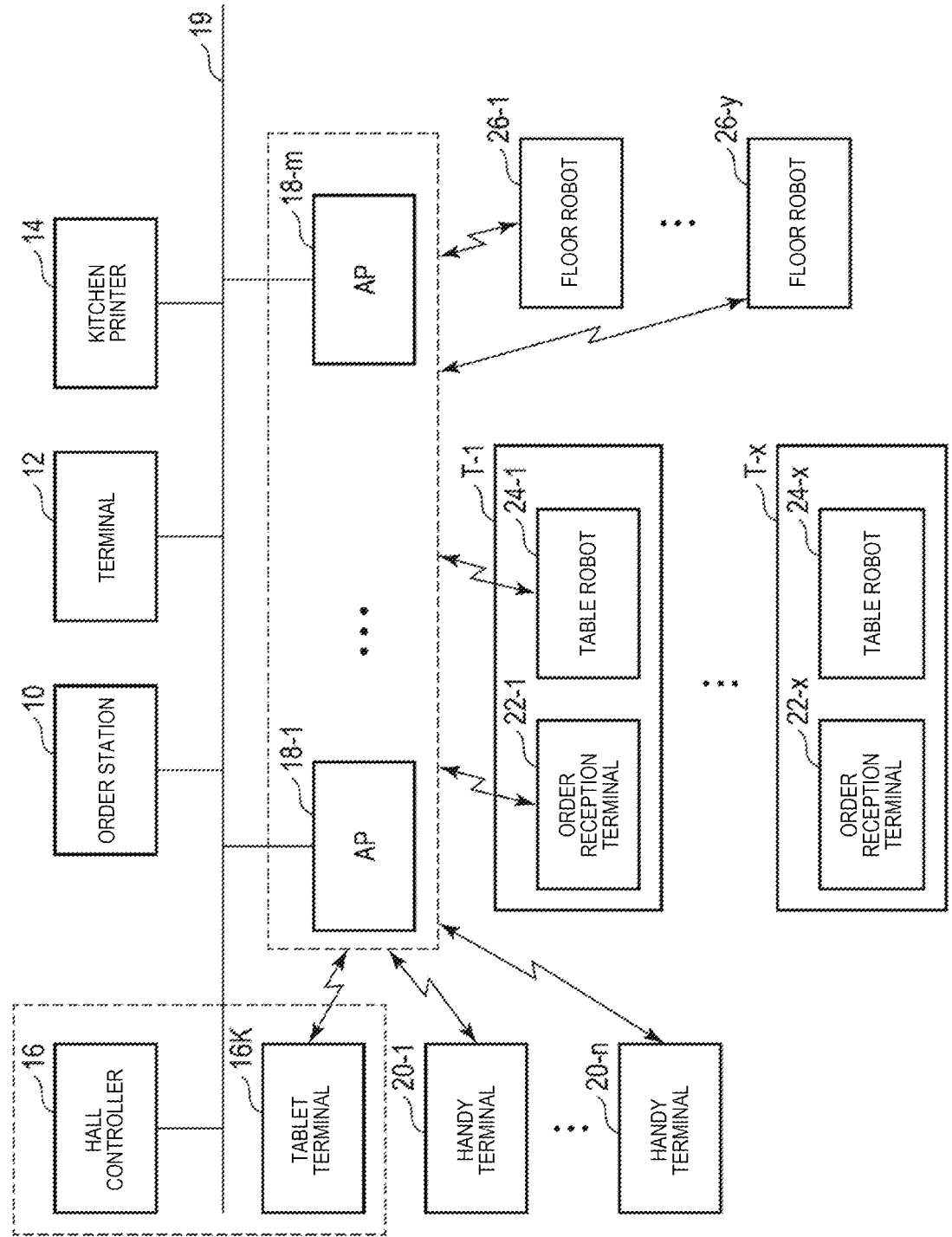
FIG. 1 is a block diagram illustrating an order processing system according to an embodiment.

FIG. 1 is a block diagram illustrating an order processing system according to the embodiment. The order processing system is provided and operated, for example, in a restaurant.

In the order processing system, an order station 10, a Point of Sales (POS) terminal 12, a kitchen printer 14, a hall controller 16, and at least one access point (AP) 18 (18-1, ..., 18-m) are connected to each other through a network 19 such as a Local Area Network (LAN). In addition, a tablet terminal 16K, a plurality of handy terminals 20 (20-1, ..., 20-n), a plurality of order reception terminals 22 (22-1, ..., 22-x) and a plurality of table robots 24 (24-1, ..., 24-x), provided on respective tables in a restaurant, and at least one floor robot 26 (26-1, ..., 26-y) are connected to the network 19 through a wireless communication with the access point 18.

The order station 10 transmits a cooking instruction to the kitchen printer 14 based on order information received from the handy terminal 20 or the order reception terminal 22. If a delivering completion is received from the handy terminal 20, the order station 10 transmits the order information to the POS terminal 12 as sales information.

The POS terminal 12 is provided, for example, on a checkout counter, and is used to settle a cost to be paid for eating and drinking by a guest. The POS terminal 12 registers and processes the sales information, to perform settlement processing for every transaction. The sales information includes information of a sales specification of items for every customer or every table.

The kitchen printer 14 is arranged, for example, at a cooking place or a kitchen. The kitchen printer 14 prints an order slip on which food and/or beverages including alcohol (menu item) ordered by the customer and a table identification number are indicated, based on the order information received from the order station 10 to output a cooking instruction.

The hall controller 16 is a computer operating as an information processing apparatus that performs processing for controlling and managing the floor robot 26. The hall controller 16 manages a situation and/or a state (hereinafter referred to collectively as a situation) of the customer in the restaurant to control respective devices included in the order processing system according to the situation of the customer. The hall controller 16 manages, for example, a situation of a table where the customer takes a seat, customer information (number of persons, gender, age, job, and the like), an order history, an occupied time (time elapsed from taking the seat, a remaining time up to a setting end time for a prix-fix menu), and the like. The hall controller 16 displays a screen for showing the situation of the customer. Employees, e.g., waitress and waiter, of the restaurant look at the screen of the hall controller 16. The hall controller 16 inputs imaging data indicating an area, including a table on which at least an item (beverage, food, and the like) is placed, as an image capturing area, and detects a remaining quantity of the item by performing an image processing based on the imaging data. The hall controller 16 has a function of outputting recommendation information used to recommend a suitable item to the customer at an appropriate timing based on the remaining quantity of the item determined according to a result of the image processing. The hall controller 16 inputs imaging data captured by a camera provided, for example, in the table robot 24 (or the order reception terminal 22) on the table. The imaging data may be any of a still image or a moving image (video).

The tablet terminal 16K is used as an input/output device of the hall controller 16. The tablet terminal 16K communicates with the hall controller 16 through the access point 18 and the network 19. Meanwhile, the tablet terminal 16K may directly perform the wireless communication with the hall controller 16 without connecting through the access point 18. The number of tablet terminals 16K is not limited to one, and a plurality of tablet terminals 16K may be provided.

Although FIG. 1 shows the hall controller 16 implemented by a specific computer connected to the network 19, processing of the hall controller 16 described below may be performed by the tablet terminal 16K. Therefore, in the present embodiment, any one of a form, in which the hall controller 16 is implemented by the computer connected to the network 19, and a form, in which the hall controller 16 is implemented by the tablet terminal 16K can be adopted. Furthermore, the processing may be performed by not only one hall controller 16 (or the tablet terminal 16K) as described above but also the hall controller 16 in cooperation with another device (a plurality of computers or the order station 10).

The access point 18 is a wireless communication device for controlling the wireless communication with the tablet terminal 16K, the handy terminal 20, the order reception terminal 22, the table robot 24, and the floor robot 26. At least one access point 18 is arranged on, for example, a ceiling in the restaurant.

The handy terminal 20 is used by the clerk. The handy terminal 20 performs an input of the order, check-in processing of registering a customer who visits the restaurant, an input of completion of delivering the item ordered by the customer, and an output of a message according to a notification from the hall controller 16. The handy terminal 20 transmits the order information according to the input order and item information indicative of the item, of which delivering is completed, to the order station 10. The handy terminal 20 transmits various notifications to the hall controller 16 in response to the operation by the clerk.

The order reception terminal 22 (22-1, . . . , 22-x) is placed, for example, on each table T (T-1, . . . , T-x) in the restaurant. The order reception terminal 22 displays a menu and receives the order of the item (menu item) from the customer. The order reception terminal 22 transmits the input order information to the order station 10. The order reception terminal 22 displays a recommendation item screen according to the recommendation information output from the hall controller 16.

The table robot 24 (24-1, . . . , 24-x) is disposed, for example, on each table T (T-1, . . . , T-x) in the restaurant. The table robot 24 performs communication with the customer. The table robot 24 inputs the imaging data indicating an area, including the table on which at least an item (beverage, food, or the like) is placed, which is captured by the camera as the image capturing area and transmits the imaging data to the hall controller 16. In addition, the table robot 24 has a function of recognizing voice data input from a microphone, to perform a simple conversation with the customer and reception of an item order with voice of the customer. The table robot 24 includes a voice output function of outputting a message to the customer from the speaker, to perform an output of a response message, corresponding to the voice recognized through the voice recognition function, for conversation with the customer, and an output of a message according to the notification from the hall controller 16 or the order station 10.

Meanwhile, in FIG. 1, the order reception terminal 22 and the table robot 24 are implemented by separate devices. However, it is possible that the order reception terminal 22 and the table robot 24 are provided as one device.

The floor robot 26 is used to deliver the item to each table and to collect (bus) articles (tableware), such as dishes, glasses, and waste, from each table. The floor robot 26 is provided on at least one placing table on which the tableware and the like are placed. The floor robot 26 includes an autonomous travel function of traveling to a location of a designated target table along a path predetermined based on the location of the table in the restaurant. The floor robot 26 includes, for example, an anti-collision sensor, to avoid obstacles while traveling to the table.

The floor robot 26 includes a wireless communication function through the access point 18. The floor robot 26 receives, for example, an instruction input from the order reception terminal 22 by the customer, an instruction from the hall controller 16 according to the situation of the customer, or an instruction input through the operation by the employee, to perform operation according to the instruction. In addition, the floor robot 26 notifies locational data indicative of a current location thereof to the hall controller 16 through the access point 18 while traveling. The hall controller 16 displays, for example, on a floor map displaying the table arrangement, information indicating the current location (operational situation) of the floor robot 26 on a path along which the floor robot 26 travels based on the locational data received from the floor robot 26.

The floor robot 26 includes an input/output device, such as a touch panel, a person authentication function based on an image captured by the camera, a voice recognition function of voice data input from a microphone, and a voice output function of outputting a message to the customer or the clerk from the speaker to perform communication with the customer or the clerk.

Figure 2:
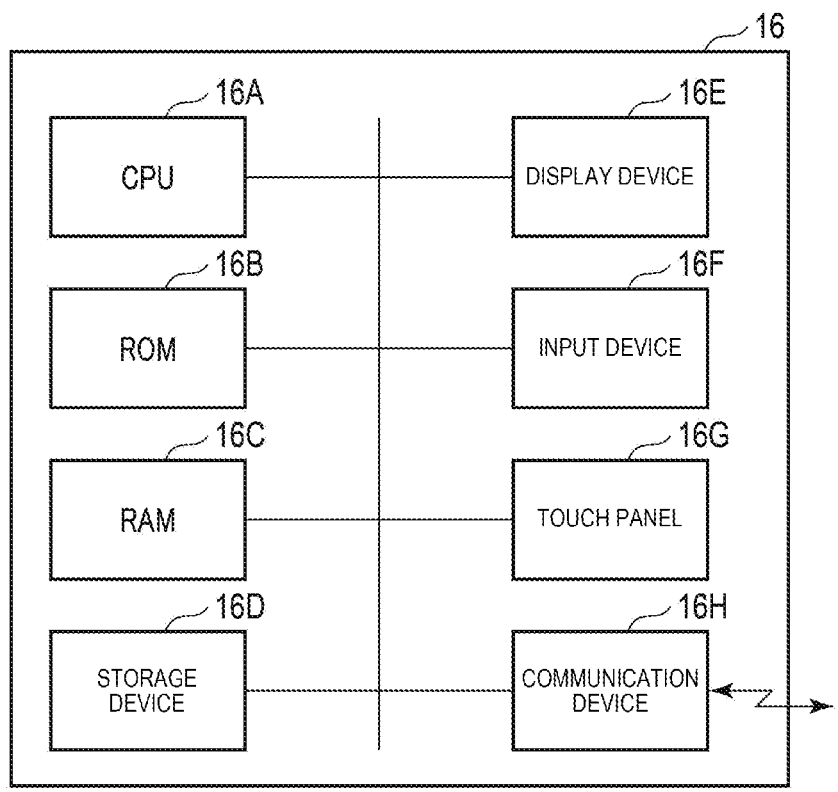
FIG. 2 is a block diagram illustrating an essential part of a hall controller.

FIG. 2 is a block diagram illustrating an essential part of the hall controller 16 according to the present embodiment.

The hall controller 16 is implemented by a specific computer. The hall controller 16 includes a Central Processing Unit (CPU) 16A, a Read Only Memory (ROM) 16B, a Random Access Memory (RAM) 16C, a storage device 16D, a display device 16E, an input device 16F, a touch panel 16G, and a communication device 16H.

The CPU 16A executes a program stored in the ROM 16B or the storage device 16D to control above respective devices of the hall controller 16. The program, executed by the CPU 16A, includes an information processing program to operate as the information processing apparatus, in addition to a basic program (Operating System (OS)). The CPU 16A executes the information processing program to manage the situation of the customer in the restaurant. The CPU 16A has an input function of inputting the imaging data transmitted from the table robot 24 (or the order reception terminal 22) through the communication device 16H, a detection function of detecting a remaining quantity of the item (beverage or food) by performing the image processing on the input imaging data, and an output function of outputting the recommendation information to recommend an item to the customer at an appropriate timing based on the remaining quantity of the item. In addition, the CPU 16A performs a recommendation information extraction process of determining the recommendation information according to the customer based on, for example, the situation of the table of which the seat is taken, management of the customer information (number of persons, gender, age, job, and the like), management of the order history, the occupied time (time elapsed from taking the seat, and the remaining time up to the setting end time of prix fix menu), and the like.

The ROM 16B stores the program executed by the CPU 16A. The RAM 16C forms various work memory areas. The storage device 16D includes, for example, a Hard disk drive (HDD), and a Solid State Drive (SSD) to store various programs and various data.

The display device 16E is, for example, a Liquid Crystal Display (LCD). The input device 16F is, for example, a pointing device such as a keyboard or a mouse. The touch panel 16G performs display and input through touch operation thereon.

The communication device 16H controls communication with, for example, respective devices through the network 19. The communication device 16H may include a wireless communication function.

Figure 3:
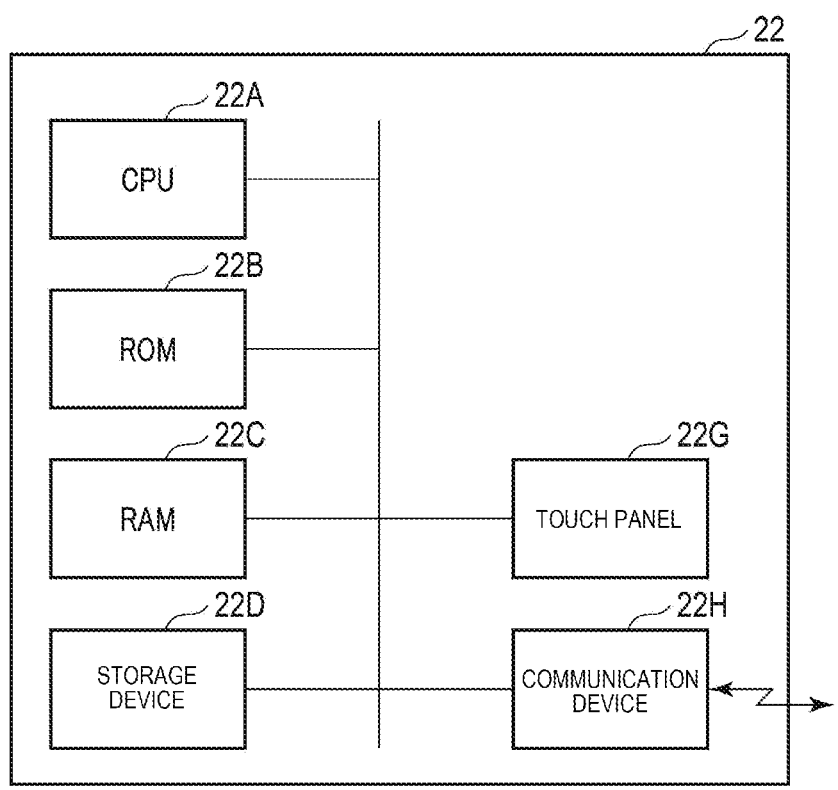
FIG. 3 is a block diagram illustrating an essential part of an order reception terminal.

FIG. 3 is a block diagram illustrating an essential part of the order reception terminal 22 according to the present embodiment.

The order reception terminal 22 is implemented by, for example, a specific tablet-type computer. The order reception terminal 22 includes a CPU 22A, a ROM 22B, a RAM 22C, a storage device 22D, a touch panel 22G, and a communication device 22H.

The CPU 22A executes a program stored in the ROM 22B or the storage device 22D to control operation sections of the order reception terminal 22. The program executed by the CPU 22A includes an order reception program (application program) to operate as the order reception terminal 22, in addition to the basic program (Operating System (OS)). The CPU 22A executes the order reception program to perform processing of displaying a menu screen, receiving an input operation by the customer, transmitting the order information to the order station 10 according to the item selected from the menus screen through the input operation by the customer, notifying (displaying or voice outputting) of a recommended item according to the recommendation information transmitted from the hall controller 16 (or the order station 10). The CPU 22A displays a screen (Graphical User Interface (GUI)) according to the respective processing described above on the touch panel 22G.

The ROM 22B stores program executed by the CPU 22A. The RAM 22C forms various work memory areas. The storage device 22D includes, for example, the HDD, and the SSD, to store the various programs and various data. The touch panel 22G performs the display and the input through touch operation. The communication device 22H controls the wireless communication with the access point 18.

Meanwhile, the order reception terminal 22 may include a similar function as the table robot 24 described below, and thus the table robot 24 can be omitted. In this case, the camera, the microphone, and the speaker are provided in the order reception terminal 22, and thus control functions, corresponding to the respective devices, which are similar to those of the table robot 24 described below, are provided.

Figure 4:
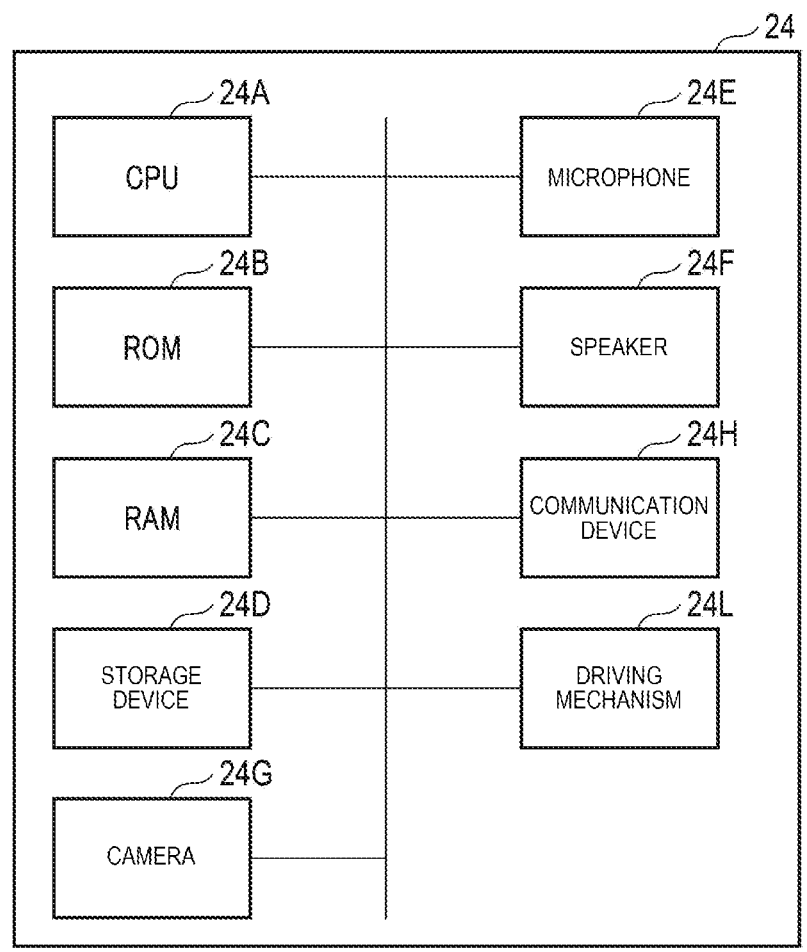
FIG. 4 is a block diagram illustrating an essential part of a table robot.

FIG. 4 is a block diagram illustrating an essential part of the table robot 24 according to the present embodiment.

The table robot 24 includes a function of a specific computer. The table robot 24 includes a CPU 24A, a ROM 24B, a RAM 24C, a storage device 24D, a microphone 24E, a speaker 24F, a camera 24G, a communication device 24H, and a driving mechanism 24L.

The CPU 24A executes a program stored in the ROM 24B or the storage device 24D to control the respective operation sections of the table robot 24. The program executed by the CPU 24A includes a control program to operate as the table robot 24, in addition to a basic program (Operating System (OS)). The CPU 24A executes the control program to control an operation of the camera 24G and performs an output function of outputting the imaging data captured by the camera 24G to the hall controller 16 through the communication device 24H. In addition, the CPU 24A executes the control program to control an operation for communication with the customer. The communication with the customer includes communication through the voice (conversation), communication through the operation, and the like. The CPU 24A performs a voice recognition function of recognizing voice data input from the microphone 24E, and a function of outputting voice from the speaker 24F to communicate with the customer through voice (conversation). The CPU 24A recognizes voice from the customer to perform the conversation, and to receive order of the item from the customer, using the function of recognizing voice. In the function of recognizing voice, for example, a predetermined voice command (word or sentence) can be recognized and thus processing according to the voice command can be performed. In addition, the CPU 24A uses the voice output function of outputting a response message answering to the voice, used to perform the communication, which is recognized through the voice recognition function, and to output a message responding to a notification from the hall controller 16 or the order station 10.

The ROM 24B stores program executed by the CPU 24A. The RAM 24C forms various work memory areas. The storage device 24D includes, for example, the HDD, and the SSD, to store various programs and various data.

The camera 24G performs an image capturing under the control of the CPU 24A, to output imaging data. The camera 24G captures an image in a still form or a moving form (video). The communication device 24H controls wireless communication with the access point 18.

The CPU 24A operates the driving mechanism 24L. The table robot 24 includes a plurality of housings (for example, an upper housing and a lower housing), and a part of the housings can be moved by the driving mechanism 24L. The CPU 24A drives, for example, for the communication with the customer, the driving mechanism 24L in accordance with a normal state, conversation with voice, order of the item, and output timings of various message voice. The CPU 24A also drives the driving mechanism 24L such that a direction of the camera 24G is changed to change the image capturing area of the camera 24G.

The driving mechanism 24L has a mechanical structure to move at least a part of the housings of the table robot 24.

Figure 5:
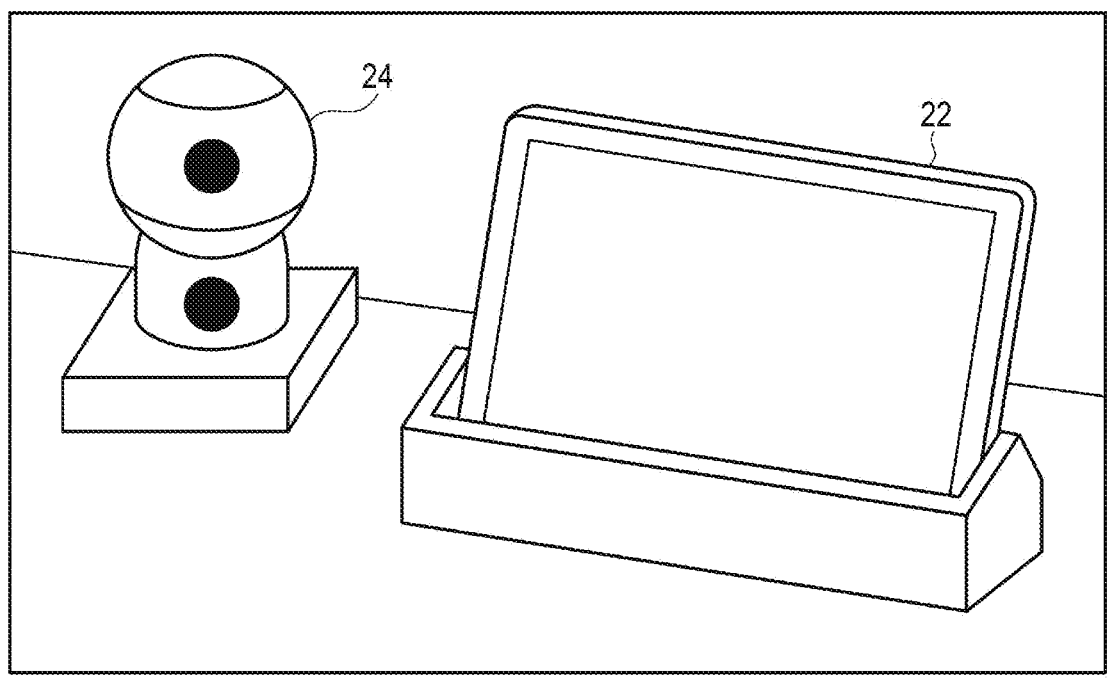
FIG. 5 is a diagram illustrating appearances of the order reception terminal and the table robot.

FIG. 5 is a diagram illustrating appearances of the order reception terminal 22 and the table robot 24 according to the present embodiment. FIG. 5 shows an arrangement of the order reception terminal 22 and the table robot 24 disposed side by side on a table.

Basically, the order reception terminal 22 is placed in a cradle on the table. The order reception terminal 22 can be taken from the cradle and used in a state of being held by the customer, if necessary.

The table robot 24 is used to perform communication with the customer, and thus it is desirable that the table robot 24 is positioned at a location close to the customer who takes the seat at the table. In addition, the table robot 24 performs the image capturing of an area including the table on which at least an item (beverage, food, or the like) is placed as the image capturing area. For example, the table robot 24 may capture not only an image of the table on which the item is placed but also an image of an area including the customer who takes the seat at the table as the image capturing area. Therefore, the table robot 24 is placed at a location at which the camera 24G of the table robot 24 can capture an image of the target image capturing area.

The camera 24G of the table robot 24 shown in FIG. 5 is mounted, for example, in the upper housing, and also performs the image capturing while the upper housing moves vertically and horizontally in a prescribed range by the driving mechanism 24L. Therefore, an image of a wider area can be captured as the image capturing area compared with a case in which the image capturing direction of the camera 24G is fixed.

Subsequently, an operation of the order processing system according to the present embodiment is described.

In the order processing system, check-in processing for registering a customer who visits the restaurant is performed if the customer takes a seat at one of the tables. In the check-in processing, registration of a table number, and inputs of the customer information (number of persons, gender, age, job, and the like), an ordered course menu (a plurality of items to be served and a time are predetermined (prix fix menu)), and the like are performed. For example, the customer information may be input through the operation on the handy terminal 20 carried by the clerk or may be input through the operation on the order reception terminal 22 by the customer.

In addition, a video image (imaging data) captured by the camera of the table robot 24 is transmitted to the hall controller 16, the hall controller 16 (or the tablet terminal 16K) displays the video image, and thus the customer information may be input by a clerk who checks the video image. Furthermore, the hall controller 16 performs person authentication processing on an image acquired by photographing the customer to detect number of persons, gender, age, job, and the like and a result of the detection may be input as the customer information.

When the customer orders an item after the customer takes the seat at the table, the customer operates the order reception terminal 22 or orders the item to the clerk who carries the handy terminal 20. The order reception terminal 22 displays the menu on the touch panel 22G, and transmits the order information of the item selected from the menu through the touch operation on the touch panel to the order station 10. The menu is displayed in such a manner that a usual menu including all items categorized and a recommendation menu including specific recommendation items prepared in advance are switched in response to the input operation by the customer.

The ordered item is delivered to the table by the clerk, i.e., waiter or waitress, or the floor robot 26. For example, if a table, i.e., delivery destination, is designated after the ordered items, such as a glass (beverage) or a dish (food) is placed on the placing table, the floor robot automatically travels to the designated table deliver the item.

The hall controller 16 checks the situation of the table at which the customer takes the seat, using the video image captured by the camera 24G of the table robot 24. In the present embodiment, the hall controller 16 detects progress in eating and drinking of the delivered item (beverage or food), that is, a situation in which the item consumed by the customer based on the captured video image, and outputs the recommendation information to recommend an item to the customer at an appropriate timing. Hereinafter, processing (according to a first embodiment, a second embodiment, and a third embodiment) of outputting the recommendation information by the hall controller 16 is described.

First Embodiment

FIG. 6(A) is a flowchart illustrating processing performed by the table robot 24 and the order reception terminal 22 according to the first embodiment, and FIG. 6(B) is a flowchart illustrating processing performed by the hall controller 16 according to the first embodiment. In the description below, in the flowchart of FIG. 6(A), Act A1 to Act A5 are described as operations of the table robot 24 and Act A6 to Act A11 are described as operations of the order reception terminal 22. If the order reception terminal 22 performs a function of the table robot 24, the processing of the flowchart illustrated in FIG. 6(A) is performed by the order reception terminal 22.

After the item is delivered to the table, the table robot 24 performs capturing of an image (first image) of an area including at least the table on which the item is placed by a camera 24G, as an image capturing area (Act A1). The captured first image shows an initial state of the item not yet consumed by the customer. The table robot 24 adds, for example, data indicating the table number to the imaging data of the first image and transmits the imaging data of the first image to the hall controller 16 through the communication device 24H (Act A2).

When the CPU 16A of the hall controller 16 receives the imaging data of the first image transmitted from the table robot 24 (Yes in Act B1), the CPU 16A stores the imaging data in the RAM 16C or the storage device 16D in association with the table number.

The CPU 16A monitors elapse of prescribed time preset for the table of which the first image is received. If it is determined that the prescribed time elapses (Yes in Act B2), the CPU 16A transmits an image transmission request to the relevant table robot 24 (Act B3).

The prescribed time may be one fixed time predetermined or may be varied according to a time which elapses after the check-in processing is performed for the customer. If the prescribed time is varied, the prescribed time is set to a short time (for example, three minutes) in a time zone (for example, 0 to 15 minutes), for example, in which eating and drinking pace of the customer is usually fast, immediately after the start. The closer the end at which an item order pace generally becomes slow, the longer the prescribed time in a step-wise. For example, the prescribed time may be set to 5 minutes in a time zone of 15 to 30 minutes and may be set to 10 minutes in a time zone of 30 to 60 minutes. In this way, processing loads may be reduced in such a way that a recommendation item menu is offered to the customer at more appropriate timing or in such a way that a frequency in the image processing being necessary is reduced in a time zone in which the item order pace becomes slow.

When the CPU 24A of the table robot 24 receives the image transmission request from the hall controller 16 (Yes in Act A3), for example, the CPU 24A performs capturing of an image (second image) of the same image capturing area as in a case in which the first image is captured, by the camera 24G (Act A4). The table robot 24 adds the data indicating the table number to the imaging data of the second image and transmits the resulting imaging data of the second image to the hall controller 16 (Act A5). The second image is captured such that the same image capturing area as in the case in which the first image is captured is captured again after the prescribed time elapses from the capturing of the first image.

When the CPU 16A of the hall controller 16 receives the imaging data of the second image transmitted from the table robot 24 (Yes in Act B4), the CPU 16A stores the imaging data of the second image in the RAM 16C or the storage device 16D in association with the table number, and performs comparison processing for detecting a change in a state (remaining quantity of the item) by comparing the first image with the second image.

Figure 7:
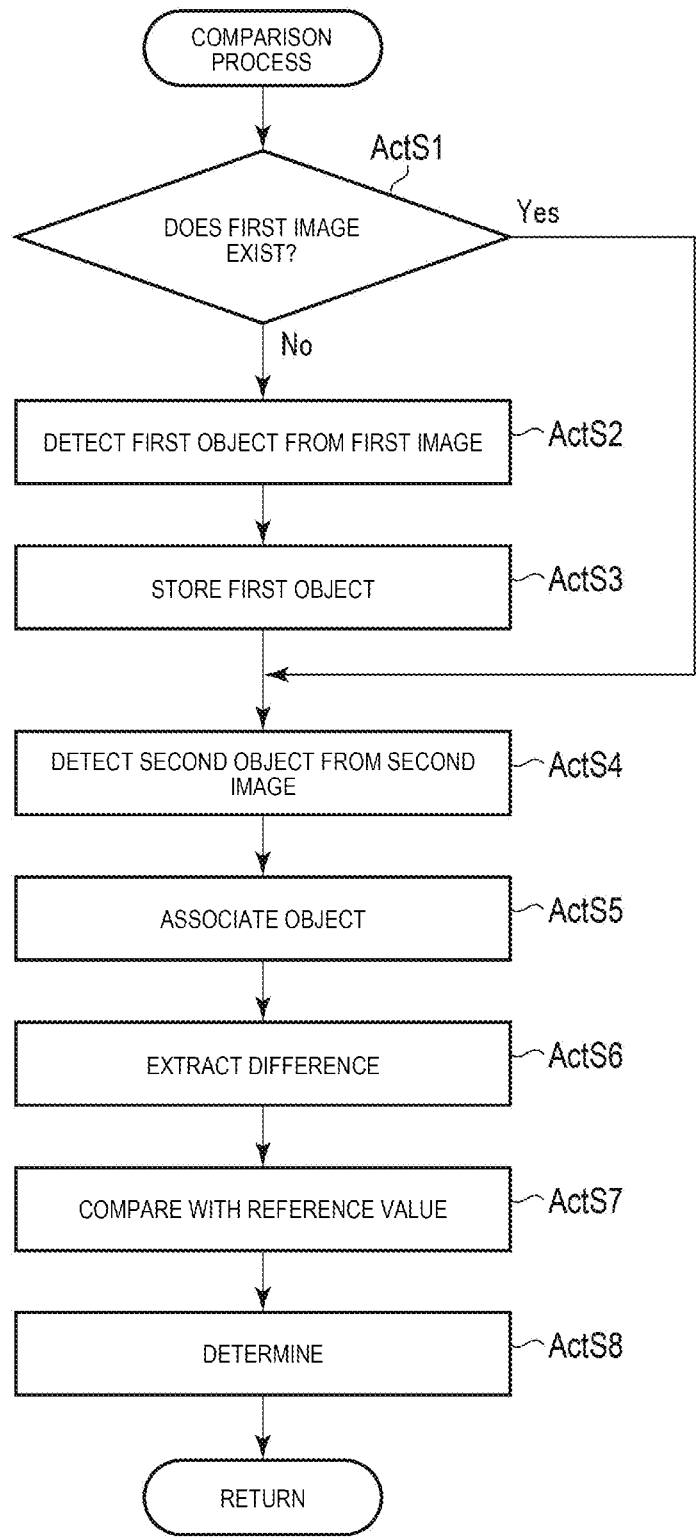
FIG. 7 is a flowchart illustrating comparison processing performed by the hall controller.

FIG. 7 is a flowchart illustrating the comparison processing performed by the hall controller 16.

First, the CPU 16A determines whether or not the first image is already received and object detection described below is completed for the first image. If the first image is not yet received (No in Act S1), the CPU 16A detects an object image (first object) corresponding to the item provided to the customer from the first image (Act S2), and stores the first object in the RAM 16C or the storage device 16D (Act S3).

Figure 8:
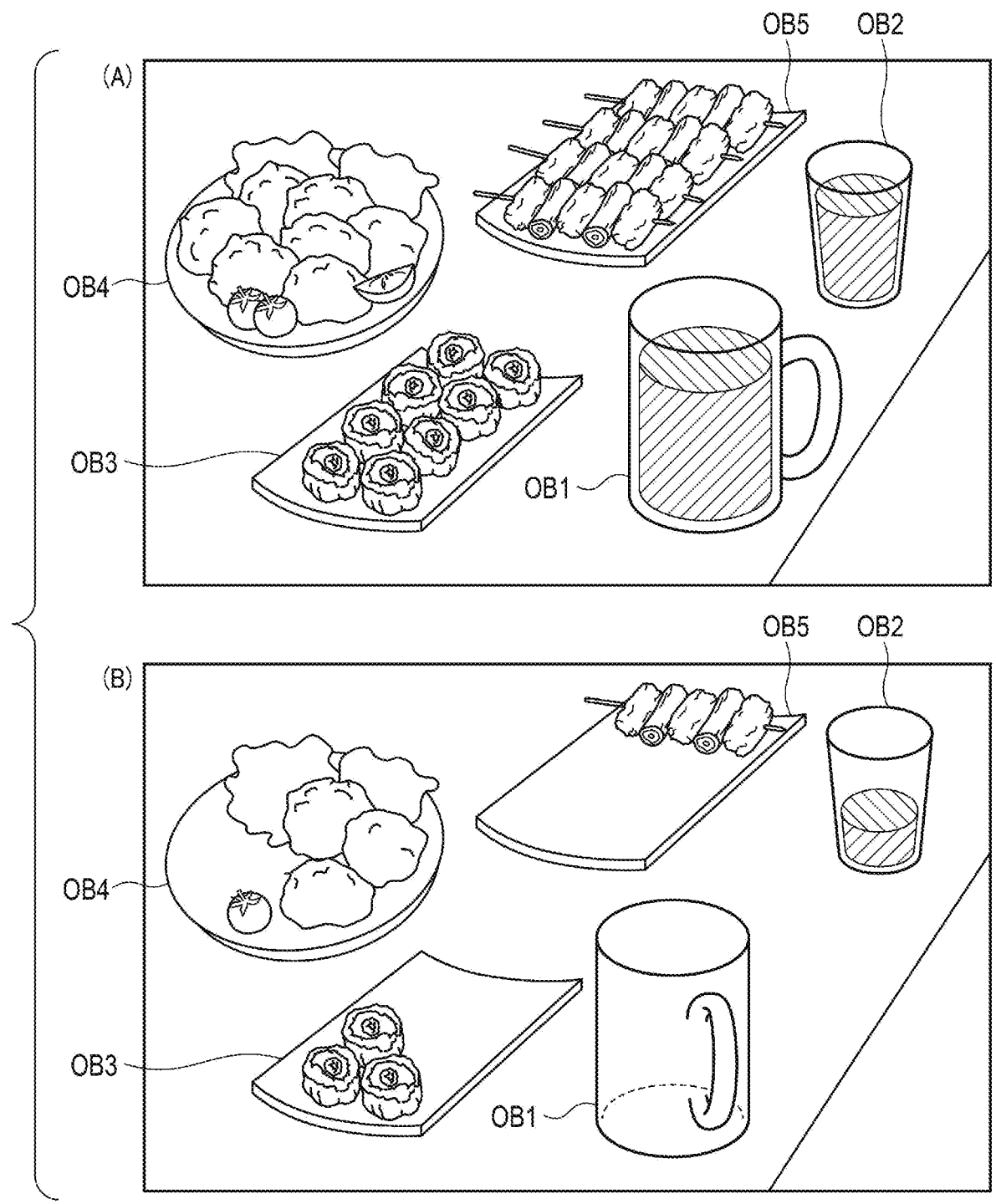
FIG. 8 is a diagram conceptually illustrating a first image and a second image captured by the table robot.

FIG. 8(A) is a diagram conceptually illustrating the first image. As illustrated in FIG. 8(A), there is a case in which the first image captured by the camera 24G of the table robot 24 includes images respectively corresponding to a plurality of items. The CPU 16A detects images corresponding to the respective items as objects and gives different identification labels to the respective objects to store the objects. An image processing method for detecting an object in an image includes, for example, a method for registering feature data indicative of a feature, such as a shape and a color, of an object, i.e., detection target, in advance and performing detection based on the feature data. It may include another existing image processing method.

In a case illustrated in FIG. 8(A), for example, objects OB1 and OB2 corresponding to beverages (a beer mug and a glass) and objects OB3, OB4, and OB5 corresponding to food (dishes) are detected.

The CPU 16A detects an object image (second object) corresponding to the item provided to the customer from the second image in a similar manner to that from the first image (Act S4), and stores the second object in the RAM 16C or the storage device 16D.

FIG. 8(B) is a diagram conceptually illustrating the second image. In a case illustrated in FIG. 8(B), the objects OB1 to OB5 are detected from the second image in a similar manner to that from the first image. However, as illustrated in FIG. 8(B), since the second image is captured after the prescribed time elapses from capturing the first image, items are consumed by the customer as an eating and drinking progresses. In addition, locations at which the objects OB1 and OB2 corresponding to the beverages (beer mug and glass) are placed on the table are changed by the customer.

To detect changes (remaining quantities) in the states of respective items, the CPU 16A associates the plurality of first objects included in the first image with the plurality of second objects included in the second image (Act S5). Therefore, changes in the state for each item can be detected even though the locations of the item on the table are different at the time the first image is captured and at the time the second image is captured.

The CPU 16A extracts difference by performing comparison for each combination of the first object and the second object associated with the first object (Act S6). The CPU 16A detects a change between the state of the item captured at the time of capturing the first image and the state of the item at the time of capturing the second image.

The CPU 16A compares the difference for each combination of the first object and the second object with a preset reference value (Act S7), to determine whether or not the difference exceeds the reference value (Act S8). The reference value is used to determine a state in which the item is quite consumed, in other words, a state in which the remaining quantity is small or noting remains. The reference value is set to determine a status in which an item to be subsequently ordered is recommended. Meanwhile, a part corresponding to the remaining quantity of the item may be detected based on the difference between the first object and the second object. In this case, the reference value is set to determine the remaining quantity, the reference value is compared with the remaining quantity, and thus the state, in which the remaining quantity of the item is smaller than the preset prescribed value or nothing remains, is determined. In addition, the reference value may be set for each category of the object (beverage or food) or may be set for each item if the item can be specified at the time of detecting the object.

The CPU 16A determines whether or not a notification condition of providing the recommendation information to the customer is satisfied based on a result of the comparison processing. It is determined that the notification condition is satisfied if the first object is compared with the second object and then an object (item) of which the difference (result of the comparison) is greater than the reference value exists. The CPU 16A may determine that the notification condition is satisfied if the difference of at least one object exceeds the reference value or if differences of a predetermined number of objects exceed the reference value.

In the above-described comparison processing, the difference between the first image (first object) and the second image (second object) is extracted, and the state of the item is determined based on the difference. However, the state of the item may be determined by another method. For example, feature data of the image captured by photographing the item is registered for each of the plurality of items in advance as dictionary data, and the dictionary data is compared with the image of the respective objects extracted from the second image. Then, it may determine whether or not a degree of similarity between the image of the object and the dictionary data is below a prescribed reference value, that is, whether or not a state of the consumption of the item is quite large.

If it is determined that the notification condition is not satisfied (No in Act B6), the CPU 16A outputs no recommendation information. After the prescribed time elapses from the transmission of the last time image transmission request (Yes in Act B2), the CPU 16A transmits the image transmission request to the table robot 24 (Act B3), similarly to the above description. When the CPU 16A receives the imaging data of the second image from the table robot 24, the CPU 16A performs the comparison between the first image and the second image and determines whether or not the notification condition of providing the recommendation information to the customer is satisfied (Act B5 and Act B6), similarly to the above description.

In the second and subsequent comparison processing, the first image is already received (Yes in Act S1 in FIG. 7), and the CPU 16A omits the processing of detecting the first object from the first image. However, if an additional item is delivered, thereafter, the table robot 24 captures the first image of the additional item and transmits the imaging data of the first image (Act A1 and Act A2). In this case, the CPU 16A extracts an object corresponding to the additional item from the first image, and stores the additional item similarly to another object. As to the second object disappearing from the second image, it is assumed that the item is fully consumed and collected, and the first object corresponding to the second object is also deleted.

If it is determined that the notification condition is satisfied (Yes in Act B6), the CPU 16A outputs recommendation information indicative of an item extracted by performing the recommendation information extraction process to the order reception terminal 22 according to the item of which the state is determined as a state fully consumed (the state in which the remaining quantity is small or nothing remains), and notifies the table robot 24 of output of the recommendation information (Act B7).

Figure 9:
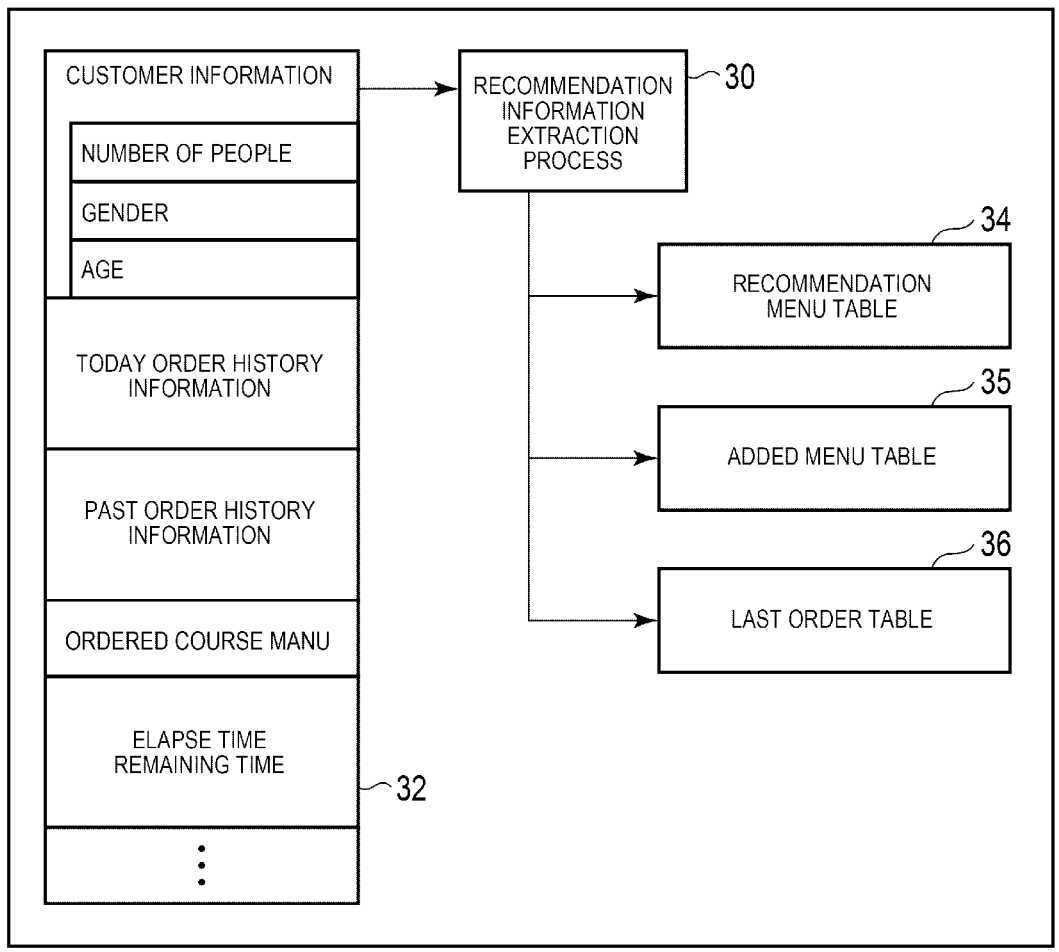
FIG. 9 is a diagram conceptually illustrating recommendation information extracted by performing a recommendation information extraction processing.

FIG. 9 is a diagram conceptually illustrating the recommendation information extracted by the recommendation information extraction processing according to the first embodiment.

The CPU 16A performs recommendation information extraction processing 30, to register the recommendation information indicative of the item, of which the remaining quantity is determined as small or nothing by performing the comparison processing, and an item to be recommended to the customer based on various information 32 stored in advance according to the customer in a recommendation menu table 34, an added menu table 35, and a last order table 36 stored in the RAM 16C or the storage device 16D. The item to be recommended as the recommendation information includes, for example, an item recommended in accordance with preference of the customer as an additional order according to the item consumed by the customer, a standard item added in association with the consumption of the item, a commodity recommended in accordance with preference of the customer as a last additional order up to the end time, and the like.

The various information stored in advance according to the customer includes, for example, customer information (number of persons, gender, age, job, and the like), today's order history information indicative of a history of items ordered today, past order history information indicative of the history of items ordered at the past visiting, information indicative of a today's ordered course menu (prix fix menu), an elapsing time from the check-in processing for the customer, a remaining time up to the end time set in the ordered course menu, or a remaining time until the restaurant is closed, and the like. The past order history information can be collected in a case of registering a customer as a member in advance such that, for example, an identification data (member ID) for identifying the member (customer) is set before eating and drinking starts, and the ordered items or course menu is stored in association with the member ID. The customer inputs the member ID from, for example, the table robot 24 or the order reception terminal 22 before he or she orders item, and then, refers to the recommendation item menu selected from the past order history information on a screen on which the recommendation item menu is displayed.

In the recommendation menu table 34, the added menu table 35, and the last order table 36, for example, at least one item is registered according to a timing at which the item is recommended to the customer. In this case, however, a plurality of items can be registered in association with priorities.

In the recommendation menu table 34, for example, an item recommended in accordance with the preference of the customer is registered as the additional order of the consumed item. The timing at which the item is recommended to the customer may be different according to, for example, the age of the customer information. For example, in a case of a child customer, eating and drinking time is generally short and thus a dessert or the like usually provided at the end of eating and drinking may be extracted earlier as the recommendation even though the remaining time sufficiently remains. In addition, if a correspondence relationship between the item and the customer is specified, the item to be recommended to the customer may be specified based on the order history (today's order history information or past order history information) for each customer.

An association between the commodity and the customer is performed in such a way that a location of the item on the table and a location of the customer who takes the seat are detected based on, for example, an image captured by the table robot 24 (camera 24G) to determine a correspondence relationship between the item and the customer.

In the added menu table 35, a standard item added with the progress of the consumption of the item is registered. The standard item includes, for example, an item added by a large number of customers, and an item ordered in combination with another item if a course menu is ordered.

In the last order table 36, an item, such as a beverage or a dessert ordered at last according to the remaining time up to the end time set in the ordered course menu or the remaining time until the restaurant is closed, is registered in accordance with the preference of the customer.

When the CPU 22A of the order reception terminal 22 receives the recommendation information from the hall controller 16 (Yes in Act A6), the CPU 22A displays a screen including the recommendation menu on the touch panel 22G in a pop-up manner (Act A7). In addition, if the hall controller 16 notifies the table robot 24 of transmitting the recommendation information to the order reception terminal 22, the table robot 24 outputs, for example, a voice message indicating that the recommendation menu is present from the speaker 24F.

Figure 10:
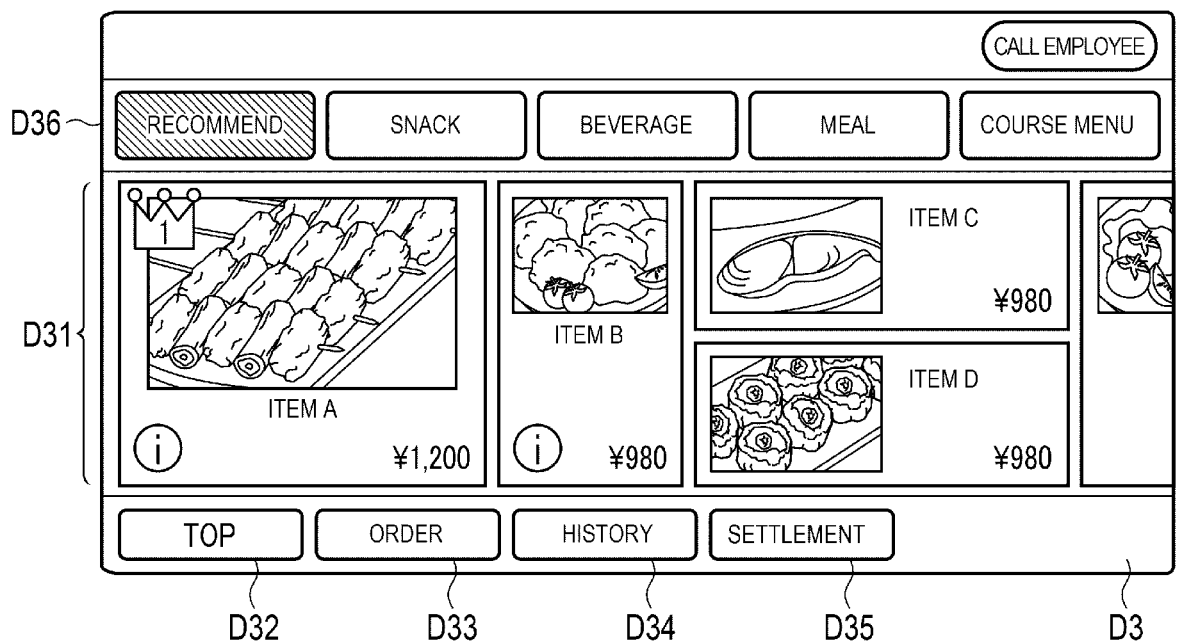
FIG. 10 is a diagram illustrating a recommendation menu screen.

FIG. 10 is a diagram illustrating a recommendation menu screen D3 displayed on the touch panel 22G of the order reception terminal 22 according to the first embodiment.

The menu screen D3 illustrated in FIG. 10 includes, for example, an item display area D31 in which the recommendation item is displayed, function buttons D32 to D35, and a menu selection area D36. In the item display area D31, for example, a plurality of recommendation items A, B, C, and D are displayed in such a manner that they are arranged in the order of priorities. If the touch operation is performed on one of the areas in which items displayed in the item display area D31 are respectively displayed, the CPU 22A determines that the item in the one area is selected.

The function buttons include a TOP button D32 which is used to switch a screen displayed on the touch panel 22G to a top screen, an order button D33 which is used to instruct to transmit an ordered content to the order station 10, a history button D34 which is used to switch a present screen to a screen on which the order history is displayed, a settlement button D35 which is used to instruct the POS terminal 12 to perform the settlement processing, and the like.

The menu selection area D36 includes, for example, buttons corresponding to respective categories such as "recommendation", "snack", "beverage & alcohol", "meal", and "course (prix fix) menu". If one of the buttons is selected, the present display is changed over to a screen including a menu of the category corresponding to the selected button.

When the CPU 22A receives an operation on the touch panel 22G (Yes in Act A8), the CPU 22A determines whether or not the instruction for ordering the item is performed. If it is determined that the instruction for ordering the item is performed (Act A9, Yes), the CPU 22A cancels the menu screen, and performs processing according to the input operation. In contrast, if it is determined that the instruction is other than the instruction for ordering the item (No in Act A9), the CPU 22A transmits the order information indicative of the designated item to the order station 10 (Act A11).

In the above description, the order of the item is received through the order reception terminal 22. However, the order of the item may be received through the table robot 24 with the voice recognition function. For example, if it is determined that the voice is a command for instructing the order of the item as a result of the recognition of the voice data input from the microphone 24E, the CPU 24A of the table robot 24 recognizes a voice indicative of the item input subsequent to the voice command. The CPU 24A transmits the item information indicative of the recognized item to the order station 10.

As to the recommendation item based on the recommendation information from the hall controller 16, the order of the item recommended may be performed through more simple voice input. For example, as to the recommendation commodity, the order information may be transmitted by inputting voice of only an item name or inputting voice of a simple message indicative of approval (for example, "order" or the like). In this way, the order of the recommendation is easily performed and thus the additional order by the customer can be promoted.

Furthermore, the recommendation item menu may be offered by not only display of the recommendation item according to the recommendation information transmitted from the hall controller 16 but also the voice command for instructing the table robot 24 to perform voice recognition. For example, if the table robot 24 performs the voice recognition of a voice command "recommendation menu" for instructing display of the recommendation menu, the table robot 24 requests the hall controller 16 to transmit the recommendation information. When receiving the request for transmission of the recommendation information, the hall controller 16 transmits the recommendation information extracted, for example, through the above-described recommendation information extraction processing, to the order reception terminal 22 (or the table robot 24). Therefore, the recommendation item menu can be provided at a timing required by the customer.

As described above, in the order processing system according to the first embodiment, the eating and drinking situation of the delivered item (beverage or food), i.e., the progress of the consumption of the item by the customer (the state in which the remaining quantity is small or nothing remains) at the time the prescribed time elapses is detected based on the captured image, to generate the recommendation information based on the item, and then the recommendation information (item) can be provided to the customer. At the table, the item can be recommended in accordance with the preference of the customer at the appropriate timing based on the image captured by the table robot 24 (or the order reception terminal 22. Even if a plurality of items of which the remaining quantities are small (or nothing) exist in the captured image, different items corresponding to each of the plurality of items can be recommended.

Second Embodiment

Figure 11:
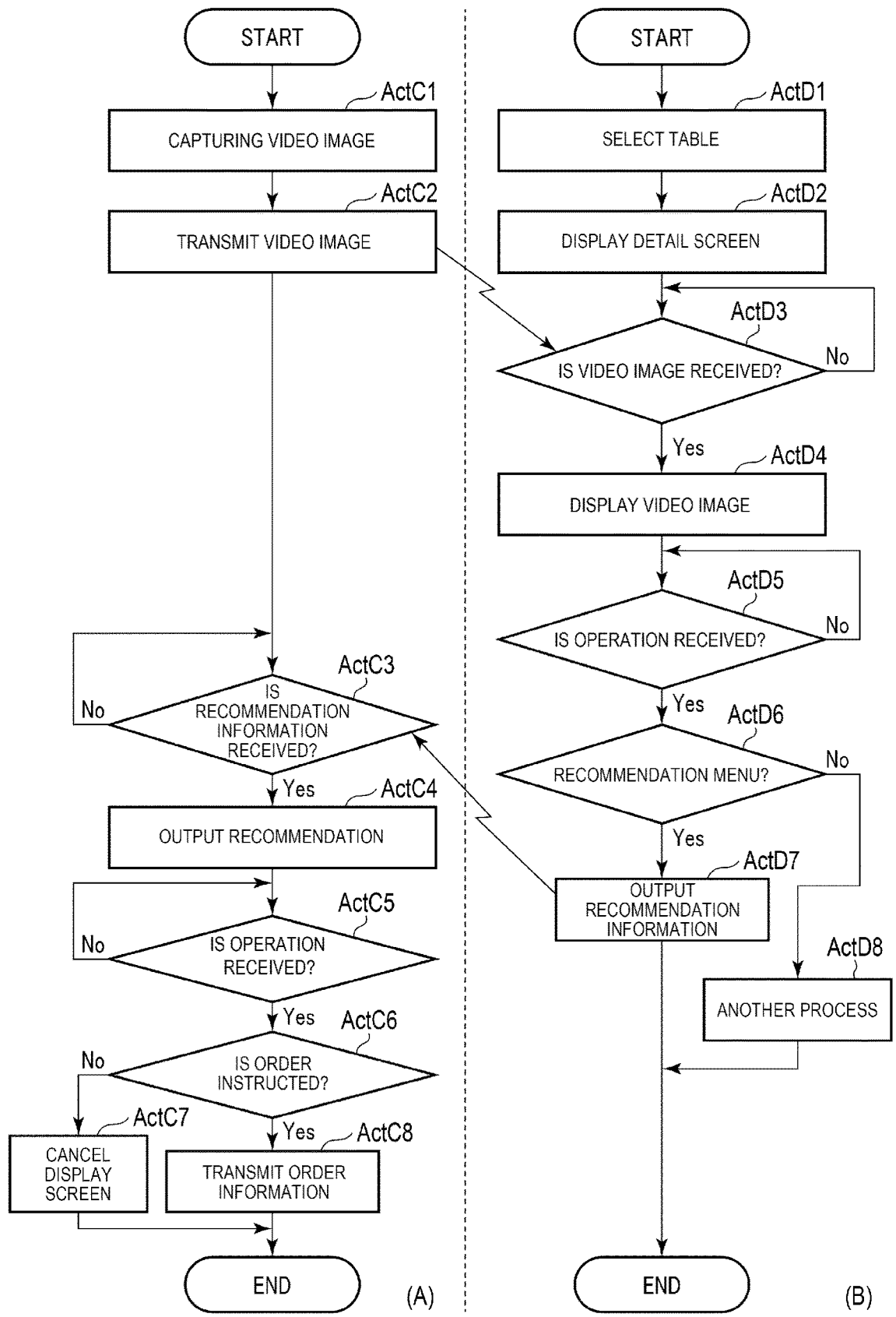
FIG. 11 is a flowchart illustrating an operation according to a second embodiment.

FIG. 11(A) is a flowchart illustrating a process performed by the table robot 24 and the order reception terminal 22 according to a second embodiment, and FIG. 11(B) is a flowchart illustrating a process performed by the hall controller 16 according to the second embodiment. In the description below, Act C1 and Act C2 are described as operations of the table robot 24, and Act C3 to Act C8 are described as operations of the order reception terminal 22 in the flowchart in FIG. 11(A). Processing in Act C3 to Act C8 is performed similarly to that in Act CA6 to Act A11 according to the first embodiment, and thus detailed description thereof is not repeated. In addition thereto, operations which are common to that in the first embodiment are not described.

In the second embodiment, a video image of an area (image capturing area) including the table on which at least item is placed is photographed by the camera 24G of the table robot 24 (or the order reception terminal 22), and the hall controller 16 enables the employee of the restaurant to check the video image.

The table robot 24 performs an image capturing by the camera 24G after the item is delivered to the table (Act C1), adds, for example, data indicative of the table number to an imaging data of the captured video image, and transmits the imaging data with the table number to the hall controller 16 through the communication device 24H (Act C2).

On the other hand, the CPU 16A of the hall controller 16 manages various situations in the restaurant based on the inputs from the handy terminal 20, the order reception terminal 22, the table robot 24, and the floor robot 26. The CPU 16A displays a screen for showing a management situation according to the input operation by the employee. For example, if one of the tables is selected on a screen showing the status of the seats, the video image of the selected table can be displayed.

Figure 12:
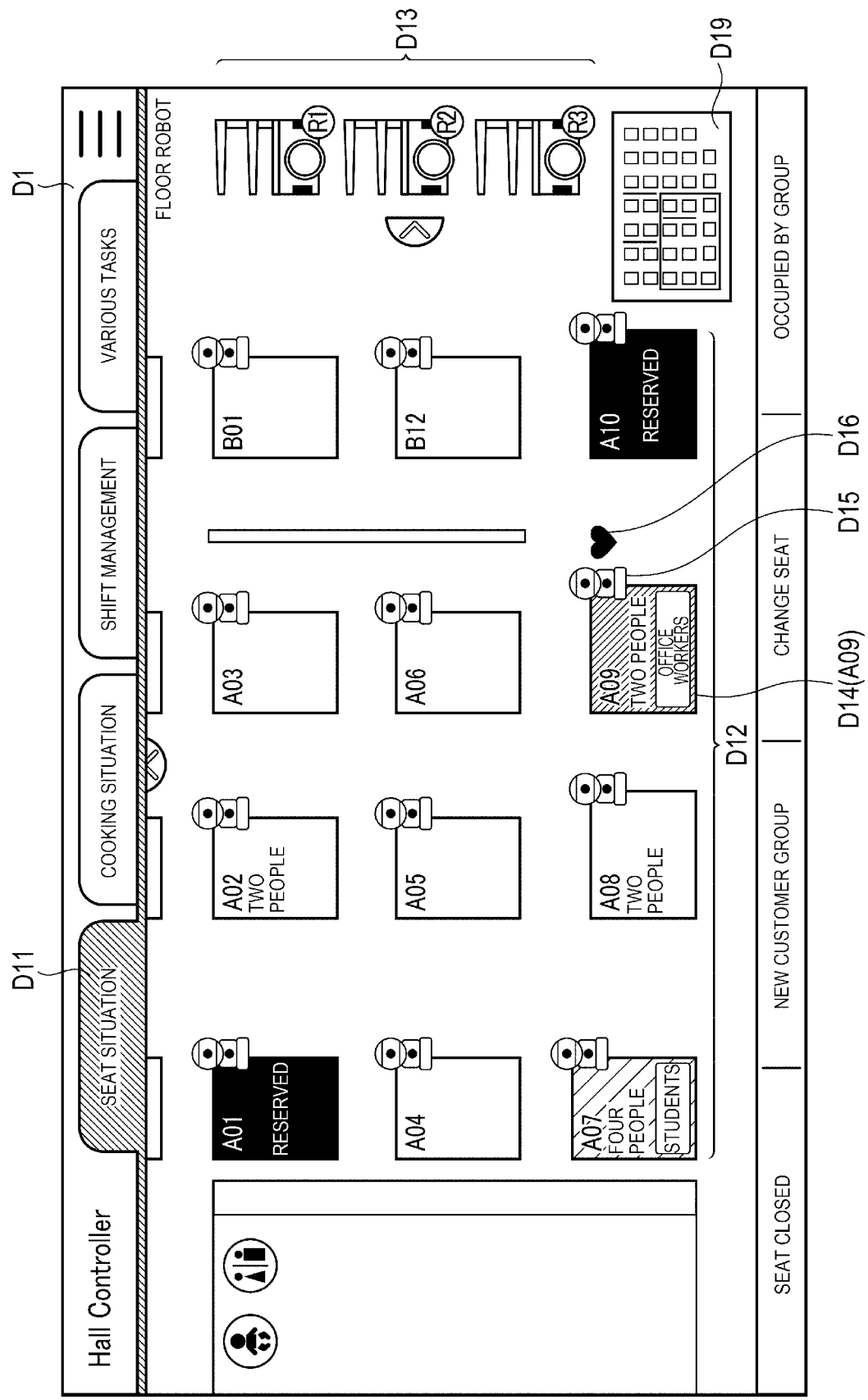
FIG. 12 is a diagram illustrating a screen showing a seat status.

FIG. 12 is a diagram illustrating a screen D1, which shows the seat status, displayed on the display device 16E or the tablet terminal 16K of the hall controller 16.

The screen D1 illustrated in FIG. 12 displays, for example, a switchover button D11, a table layout D12, a floor robot mark D13, a table mark D14 (A01 to A10), a table robot mark D15, a communication mark D16, and a table layout D19.

The switchover button D11 is used to instruct switchover of the screen, and includes buttons respectively corresponding to, for example, "cooking status", "shift management", and "various tasks" in addition to a button "seat status" on the screen illustrated in FIG. 12. The table layout D12 shows the arrangement of the plurality of tables in a display target area in the restaurant. FIG. 12 shows 12 (twelve) tables indicated with table numbers A01 to A10, B10, and B12 as the display target. The table layout D12 is changed in accordance with the display target area that is changed according to the input operation by the employee. The floor robot mark D13 is used to indicate the location and the operation state of the floor robot 26 traveling in the restaurant. In FIG. 12 3 (three) floor robots 26 works in the restaurant. The floor robot mark D13 is displayed at a location corresponding to the current location of the floor robot 26 which travels in the restaurant. The table marks D14 (A01 to A10, B10, and B12) indicate each of the plurality of tables (seat information), and the customer information and the like is displayed within the mark. The table robot mark D15 indicates that the table robot 24 is placed on the table. The communication mark D16 indicates the number of times that the table robot 24 communications with the customer. The communication between the table robot 24 and the customer includes, for example, conversation (response to the output voice message) with the table robot 24, an order of the item from the table robot 24, and the like. The table layout D19 shows the arrangement of all the tables in the restaurant, and specifies an area in which the table layout D12 is displayed.

If detecting an operation of selecting one of the table marks D14 (Act D1), the CPU 16A of the hall controller 16 displays a detail screen for the table corresponding to the selected table mark D14 on the display device 16E or the tablet terminal 16K (Act D2).

If the imaging data of the video image captured by the table robot 24 on the selected table is received (Yes in Act D3), the CPU 16A performs display of the video image on the detail screen based on the imaging data (Act D4).

Figure 13:
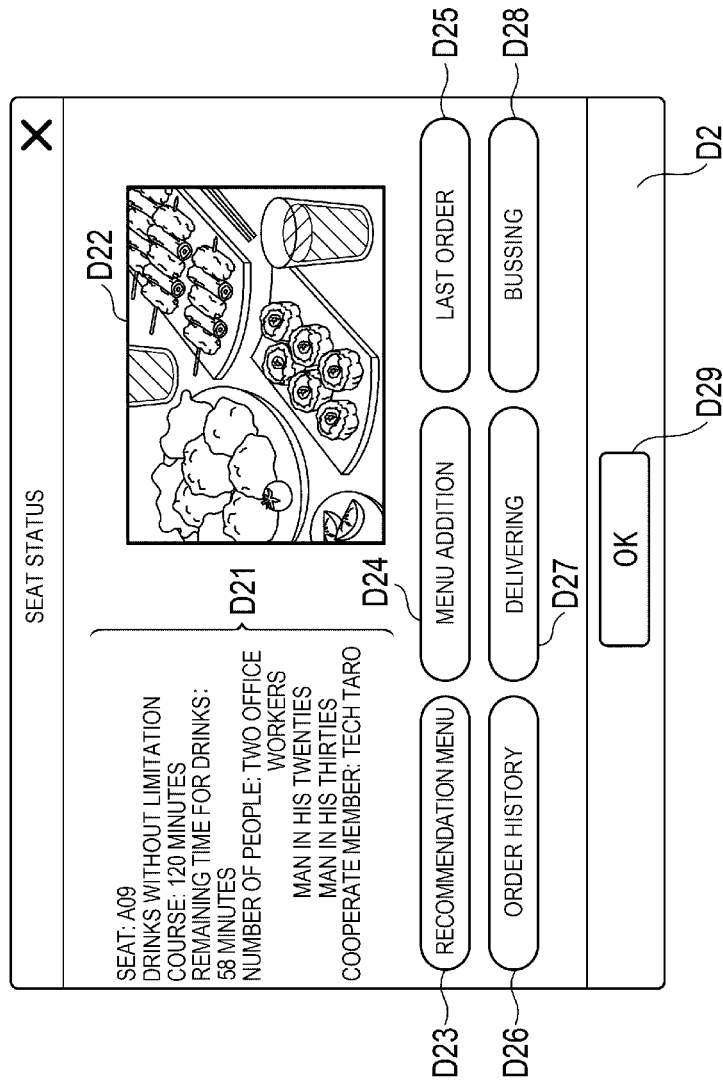
FIG. 13 is a diagram illustrating a detail screen (details of the seat status).

FIG. 13 is a diagram illustrating a detail screen D2 (details of the seat status).

The detail screen D2 illustrated in FIG. 13 includes, for example, customer management information D21, a video image display area D22, and a plurality of function selection buttons D23 to D29. The customer management information D21 including the customer information shows information (an ordered course menu and remaining time determined for the course menu) indicative of a current situation of the customer. In the video image display area D22, a video image according to the imaging data received from the table robot 24 is displayed. The CPU 16A changes the display target area of the video image based on the touch-operation on the video image display area D22. For example, in an initial state, a video image of an area on the table is displayed among video images captured by the table robot 24. Subsequently, for example, if the touch-operation is performed on the video image display area D22, a video image including entirety of the table is displayed. Furthermore, if the touch-operation is performed, a video image including the customer who takes the seat on the table is displayed. In this way, the employee performs an operation to display a video image corresponding to a random arbitrary area and thus can check the situation of the customer including the consumption state of the item, from the video image.

The plurality of function selection buttons D23 to D29 include, for example, a recommendation menu button D23, a menu addition button D24, a last order button D25, an order history button D26, a delivery button D27, a bussing button D28, and an OK button D29. The recommendation menu button D23, the menu addition button D24, and the last order button D25 are used to output the recommendation information to the order reception terminal 22 according to the input operation by the employee. The recommendation information is registered in each of the recommendation menu table 34, the added menu table 35, and the last order table 36 through the recommendation information extraction processing 30 described in the first embodiment. Meanwhile, according to the operations on the recommendation menu button D23, the menu addition button D24, and the last order button D25, a plurality of items according to the recommendation information corresponding to the respective operations may be displayed on a sub screen in a list form, and a recommendation target item may be selected by the employee. The order history button D26 is used to display the order history, for example, for today in a list form. The delivery button D27 is used to instruct the floor robot 26 to deliver the item. The bussing button D28 is used to instruct the floor robot 26 to travel to a designated table to collect (bus) tableware, glass, waste and the like from the table. The OK button D29 is used to instruct the end of the display of the detail screen D2.

If the CPU 16A of the hall controller 16 detects the operation on the button provided on the detail screen D2 (Yes in Act D5), the CPU 16A determines whether or not the input operation is performed on the button for instructing the output of the recommendation information, that is, one of the recommendation menu button D23, the menu addition button D24, and the last order button D25. If it is determined that the input operation is performed on another button (No in Act D6), the CPU 16A performs another processing according to the operated button (Act D8).

On the other hand, if it is determined that one of the recommendation menu button D23, the menu addition button D24, and the last order button D25 is operated, the CPU 16A outputs the recommendation information of the item corresponding to the operated button to the order reception terminal 22 on the table selected as the display target of the video image, and notifies the table robot 24 of output of the recommendation information (Act D7).

Hereinafter, the order reception terminal 22 and the table robot 24 operate similarly to that in the first embodiment, and thus detailed description thereof is omitted (Act C3 to Act C8).

As described above, in the order processing system according to the second embodiment, the employee checks the video image captured by the table robot 24 provided on each table on the hall controller 16, and can transmit the recommendation information to the order reception terminal 22. In the hall controller 16, the employee arbitrary selects a table on the screen D1 on which the seat statuses are displayed to display the video image in the video image display area D22 of the detail screen D2. Accordingly, the employee checks the consumption state of the item, the customer state, and the like for each table, and thus can recommend a suitable item at an appropriate timing.

Third Embodiment

FIG. 14(A) is a flowchart illustrating processing performed by the table robot 24 and the order reception terminal 22 according to a third embodiment, and FIG. 14(B) is a flowchart illustrating processing performed by the hall controller 16 according to the third embodiment. In the description below, Act E1 and Act E2 are described as operations of the table robot 24, and Act E3 to Act E8 are described as operations of the order reception terminal 22 in the flowchart in FIG. 14(A). Processing in Act E3 to Act E8 is performed similarly to that in Act CA6 to A11 in the first embodiment, and thus detailed descriptions thereof are not repeated. In addition, processing in Act F1 to Act F4 in FIG. 14(B) is performed similarly to that in Act D1 to Act D4 illustrated in FIG. 11(B) in the second embodiment, and thus detailed descriptions thereof are not repeated. In addition, processing common to that in the first embodiment or the second embodiment is not described.

In the third embodiment, similarly to the second embodiment, the employee of the restaurant can check the video image captured by the camera 24G of the table robot 24 (or the order reception terminal 22), on the hall controller 16, and, similar to the first embodiment, the recommendation information can be output according to a result of the comparison processing based on the video image received from the table robot 24 as well.

In the third embodiment, the first image is extracted from the video image received from the table robot 24, for example, after the item is delivered and is stored. Similarly to the first embodiment, if determining that the prescribed time elapses (Yes in Act F5), the CPU 16 of the hall controller 16 extracts the second image from the video image and performs the comparison processing of comparing the first image with the second image (Act F6). The comparison processing is performed similarly to the first embodiment, and thus detailed description thereof is omitted.

If it is determined that the notification condition of providing the recommendation information to the customer is satisfied based on the result of the comparison processing (Yes in Act F7), the CPU 16A outputs the recommendation information to the order reception terminal 22 and notifies the table robot 24 of output of the recommendation information (Act F8), similarly to the first embodiment.

As described above, in the order processing system according to the third embodiment, the employee checks the video image captured by the table robot 24 on each table, on the hall controller 16, and a change in the state of the item (the state in which the remaining quantity is small or nothing remains) based on the video image is detected. Thus, the layout information can be automatically output without requiring the operation by the employee. Therefore, a suitable item can be recommended at an appropriate timing without applying operational loads to the employee.

Meanwhile, in the description according to the above-described embodiments, the image capturing is performed by the camera provided in the table robot 24 or the order reception terminal 22. However, one or more cameras are provided in the vicinity (including an upper part) of the table separately from the table robot 24 or the order reception terminal 22, and the image capturing may be performed in an area, for example, including the table and the customer positioned in the vicinity of the table as an image capturing area.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

In addition, in the processes described in the above-described embodiments, it is possible to write a program which is capable of being executed by the computer in, for example, a recording medium, such as a magnetic disk (a flexible disk, a hard disk, or the like), an optical disk (a CD-ROM, a DVD, or the like), or a semiconductor memory, and to provide the program to various devices. In addition, it is possible to transfer the program using a communication medium and to provide the program to the various devices. The computer reads the program recorded in the recording medium or receives the program through the communication medium, and performs the above-described processes in such a way that an operation is controlled by the program.

What is claimed is:

1. A monitoring-based service providing system comprising:
   a table monitoring terminal associated with and disposed on one of a plurality of tables in a venue, the table monitoring terminal including, in a housing thereof:
      a camera;
      a driving mechanism configured to change a direction of the camera;
      a first communication interface; and
      a first controller configured to control the driving mechanism such that the camera is directed to at least an orally-consumable item on an associated table, and control the first communication interface to transmit image data of an image including an orally-consumable item captured by the camera;
   a central control terminal including:
      a second communication interface communicable with the first communication interface; and
      a second controller configured to:
         compare the image data received by the second communication at first timing with the image data received by the second communication interface at second timing after the first timing;
         determine a remaining amount of the orally-consumable item based on a comparison result of the image data received at the first and second timing; and
         generate recommendation information upon the determined remaining amount decreasing to a predetermined threshold, and control the second communication interface to transmit the generated recommendation information; and
   an order terminal associated with and disposed on said one of the plurality of tables, the order terminal provided separately from the table monitoring terminal and including, in a housing thereof:
      a third communication interface communicable with the second communication interface;
      a display; and
      a third controller configured to control the display to display a recommendation screen based on the recommendation information received by the third communication interface.

2. The monitoring-based service providing system according to claim 1, wherein
   the second controller is further configured to control the second communication interface to transmit an image data request to the first communication interface when a predetermined period of time has passed since reception of the image data at the first timing.

3. The monitoring-based service providing system according to claim 2, wherein
   the second controller causes the image data request to be transmitted a first predetermined time period after the reception of the image data at the first timing, when a table monitoring period is a first period, and causes the image data request to be transmitted a second predetermined time period after the reception of the image data at the first timing when the table monitoring period is a second period longer than the first period, wherein the second predetermined time period is longer than the first predetermined time period.

4. The monitoring-based service providing system according to claim 1, wherein
the first controller is further configured to control the driving mechanism such that the camera is directed to a plurality of orally-consumable items on the associated table, and
the second controller is further configured to determine the remaining amount with respect to each of the plurality of orally-consumable items, and perform an operation to generate the recommendation information with respect to each of the plurality of orally-consumable items.

5. The monitoring-based service providing system according to claim 1, wherein
the central control terminal further includes a second display and an operation panel, and
the second controller is further configured to:
control the second display to display a table map of the venue, and
control the second display to display the image including the orally-consumable item in response to selection of the one of the tables in the table map using the operation panel.

6. The monitoring-based service providing system according to claim 5, wherein
the second controller is further configured to control the second communication interface to transmit the recommendation information upon generation of an instruction to transmit the recommendation information using the operation panel.

7. The monitoring-based service providing system according to claim 1, wherein
the second controller is further configured to extract first object image data corresponding to the orally-consumable item from the image data received at the first timing and extract second object image data corresponding to the orally-consumable item from the image data received at the second timing, and compare the first object image data and the second object image data to obtain the comparison result.

8. The monitoring-based service providing system according to claim 1, wherein
the second controller is further configured to generate the recommendation information based on a type of the orally-consumable item.

9. The monitoring-based service providing system according to claim 1, wherein
the central control terminal further includes a storage device storing an order history in association with a customer identifier of a customer at the one of the tables, and
the second controller is further configured to generate the recommendation information based on the order history.

10. The monitoring-based service providing system according to claim 1, wherein
the order terminal further includes an operation panel, and
the third controller is further configured to generate an item order based on selection of an orally-consumable item in the recommendation screen using the operation panel, and control the third communication interface to transmit the item order.

11. A monitoring-based service providing method comprising:
at a table monitoring terminal associated with and disposed on one of a plurality of tables in a venue,
controlling a driving mechanism of the table monitoring terminal such that a camera of the table monitoring terminal is directed to at least an orally-consumable item on an associated table; and
transmitting image data of an image including an orally-consumable item captured by the camera at first timing, and then at second timing after the first timing;
at a central control terminal,
comparing the image data received from the table monitoring terminal at first timing with the image data received at the second timing;
determining a remaining amount of the orally-consumable item based on a comparison result of the image data received at the first and second timing; and
generating recommendation information upon the determined remaining amount decreasing to a predetermined threshold, and transmitting the generated recommendation information; and
at an order terminal associated with and disposed on said one of the plurality of tables, the order terminal provided separately from the table monitoring terminal,
controlling a display of the order terminal to display a recommendation screen based on the recommendation information received from the central control terminal.

12. The monitoring-based service providing method according to claim 11, further comprising, at the central control terminal:
transmitting an image data request to the table monitoring terminal when a predetermined period of time has passed since reception of the image data at the first timing, wherein the image data at the second timing is transmitted in response to the image data request.

13. The monitoring-based service providing method according to claim 12, wherein
when a table monitoring period is a first period, the image data request is transmitted a first predetermined time period after the reception of the image data at the first timing, and
when the table monitoring period is a second period longer than the first period, the image data request is transmitted a second predetermined time period after the reception of the image data at the first timing, the second predetermined time period being longer than the first predetermined time period.

14. The monitoring-based service providing method according to claim 11, further comprising, at the table monitoring terminal,
controlling the driving mechanism such that the camera is directed to a plurality of orally-consumable items on the associated table; and
determining the remaining amount with respect to each of the plurality of orally-consumable items, and performing an operation to generate the recommendation information with respect to each of the plurality of orally-consumable items.

15. The monitoring-based service providing method according to claim 11, further comprising, at the central control terminal:

displaying a table map of the venue; and displaying the image including the orally-consumable item in response to selection of the one of the tables in the table map using an operation panel of the central control terminal.

16. The monitoring-based service providing method according to claim 15, wherein the recommendation information is transmitted upon generation of an instruction to transmit the recommendation information using the operation panel.

17. The monitoring-based service providing method according to claim 11, further comprising, at the central control terminal:

extracting first object image data corresponding to the orally-consumable item from the image data received at the first timing;

extracting second object image data corresponding to the orally-consumable item from the image data received at the second timing; and comparing the first object image data and the second object image data to obtain the comparison result.

18. The monitoring-based service providing method according to claim 11, wherein the recommendation information is generated based on a type of the orally-consumable item.

19. The monitoring-based service providing method according to claim 11, further comprising, at the central control terminal:

storing an order history in association with a customer identifier of a customer at the one of the tables, wherein the recommendation information is generated based on the order history.

20. The monitoring-based service providing method according to claim 11, further comprising, at the order terminal:

generating an item order based on selection of an orally-consumable item in the recommendation screen using an operation panel of the order terminal; and transmitting the item order.

\* \* \* \* \*

UNITED STATES PATENT AND TRADEMARK OFFICE
CERTIFICATE OF CORRECTION

PATENT NO. : 11,093,995 B2  
APPLICATION NO. : 16/289381  
DATED : August 17, 2021  
INVENTOR(S) : Motonobu Kawamura et al.

Page 1 of 1

It is certified that error appears in the above-identified patent and that said Letters Patent is hereby corrected as shown below:

In the Drawings

Figure 6:
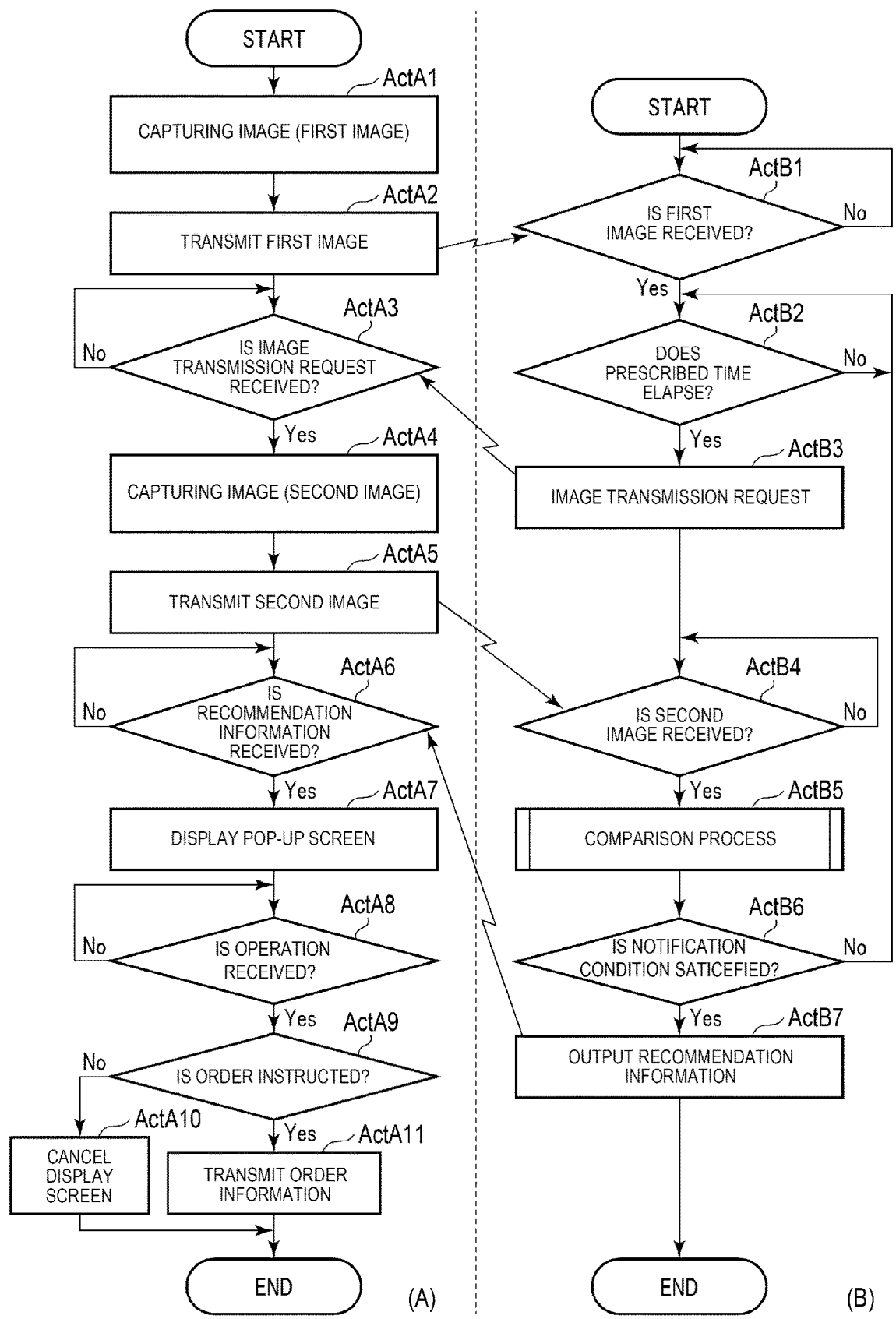
FIG. 6 is a flowchart illustrating an operation according to a first embodiment.

Sheet 5, FIG. 6, ActB6, "SATICEFIED" should read --SATISFIED--.

Sheet 8, FIG. 9, Box 32, "MANU" should read --MENU--.

Figure 14:
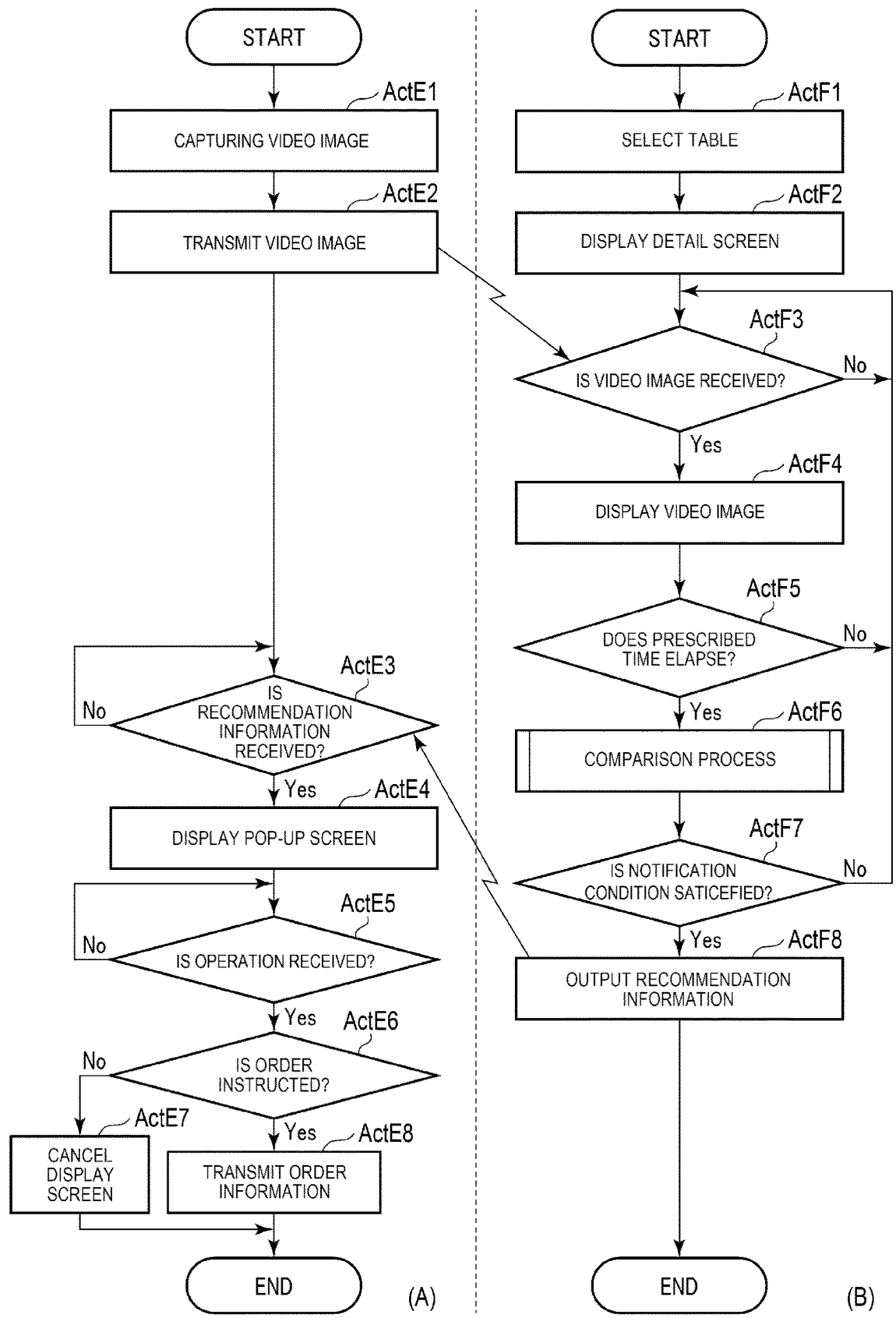
FIG. 14 is a flowchart illustrating an operation according to a third embodiment.

Sheet 12, FIG. 14, ActF7, "SATICEFIED" should read --SATISFIED--.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*